Jan. 3, 1950     C. S. CRAFTS     2,493,059
CLUTCH AND LOCKING DEVICE THEREFOR
Filed March 1, 1945
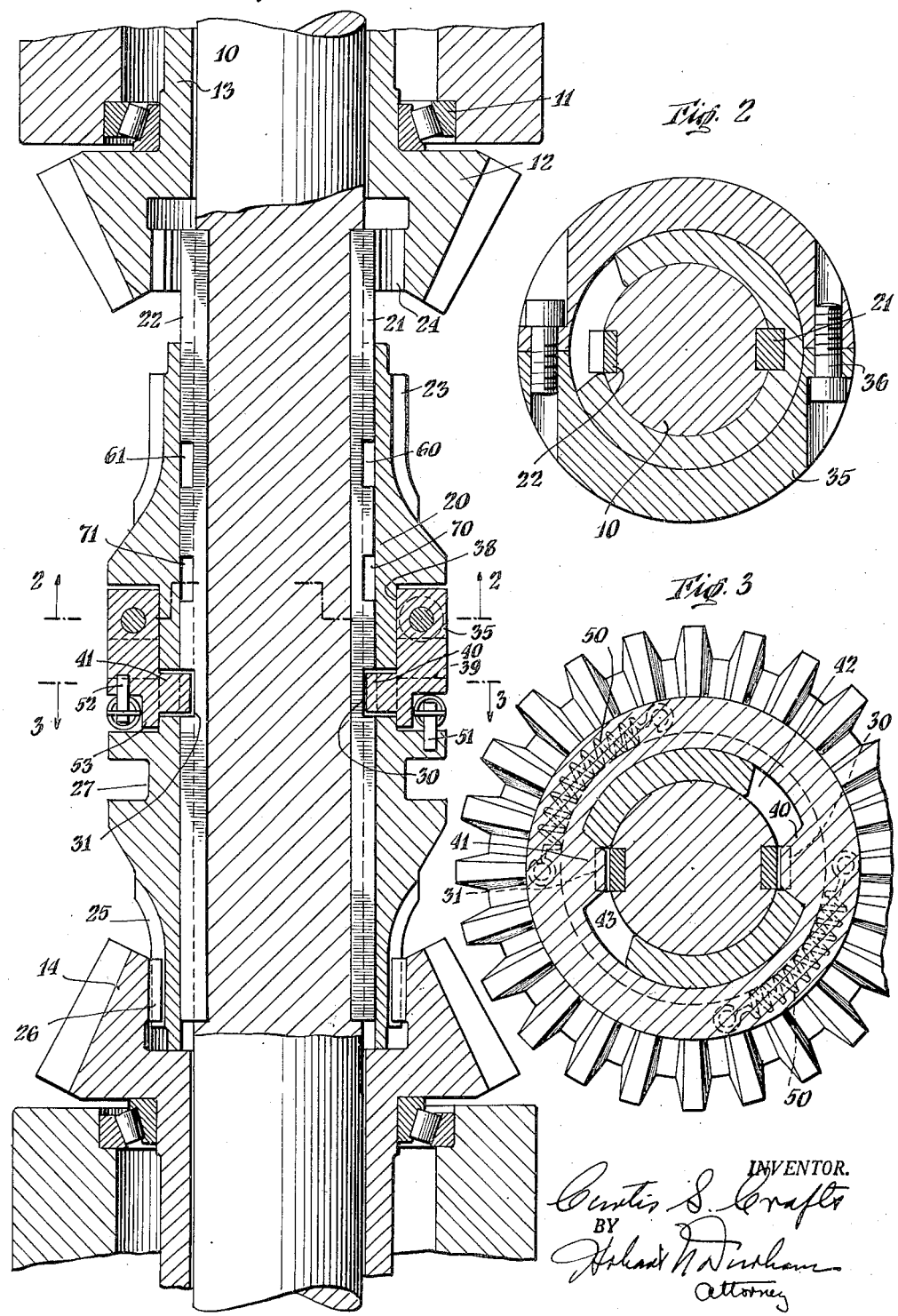
INVENTOR.

Patented Jan. 3, 1950

2,493,059

UNITED STATES PATENT OFFICE 2,493,059

CLUTCH AND LOCKING DEVICE THEREFOR

Curtis S. Crafts, Oak Park, Ill., assignor to The Goss Printing Press Company, Chicago, Ill., a corporation of Illinois Application March 1, 1945, Serial No. 580,345

14 Claims. (Cl. 192—21)

The invention relates to improvements in clutches and more particularly to a new and useful clutch construction applicable to the drive shaft of a printing press.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Fig. 1 is a longitudinal vertical section of a clutch construction embodying the invention;

Fig. 2 is a horizontal section on line 2—2 of Fig. 1;

Fig. 3 is a horizontal section on line 3—3 of Fig. 1.

In its broad principles the present invention may be considered an improvement over that disclosed and claimed in my copending application filed as of even date herewith, Serial No. 580,344. In that respect, the invention extends the principles of the aforesaid application to a clutch wherein forward and reverse driving positions and an intermediate neutral or uncoupled position are provided, the clutching member being positively locked in any of said three positions when there located. Another object of the invention is to provide such a sliding clutch construction which may be locked in any of said three positions without requiring the use of a shifter ring or other external mechanism for positively locating the sliding clutch in such positions and there locking it. The invention further provides a simplified construction for locking such a clutch in two or three positions and is primarily applicable to the vertical drive shaft arrangement of a multicolor press wherein it is required that the directions of the printing cylinders be reversed in order to superimpose one color upon another. It will be understood, however, that this is but one illustrative application of the invention and it is not limited to such use.

Referring now in detail to the present preferred embodiment of the invention, a vertical color press drive shaft 10 is shown with a bevel gear 12 at the end of a sleeve 13, mounted in preloaded bearings 11 for normally free rotation about said shaft. A lower bevel gear 14 is similarly rotatable about shaft 10, being positioned to engage the drive of a printing cylinder (not shown) for driving same in one direction, while the gear 12 is adapted to drive said cylinder in the reverse or opposite direction.

The invention provides a clutching or coupling sleeve 20 which is slidable along shaft 10 and positively driven therefrom by diametrically opposed keys 21 and 22. At its upper end the sleeve 20 is provided with vertically disposed spur gear teeth 23 which are adapted to mesh with ring gear teeth 24 on the interior of bevel gear 12 above. Similarly the lower end of sleeve 20 is provided with spur gear teeth 25 which mesh with the internal gear teeth 26 of bevel gear 14, the mechanism of Fig. 1 being shown in this latter position. The sleeve 20 is preferably provided with an annular groove 27 for the application of a special tool (not shown) to shift the sleeve along the shaft.

The invention provides means for locking the clutching sleeve 20 in driving position with respect to the lower gear 14 as shown. For this purpose the keys 21 and 22 are notched or cut out at 30 and 31 respectively to provide notches flush with the surface of the shaft 10. A locking ring 35, preferably split for purposes of assembly and joined by bolts 36, is seated within an annular groove 38 formed in the central portion of the clutched sleeve 20. Said ring is mounted for limited rotational movement with respect to the sleeve 20 about their common axis and is provided with inwardly projecting tapered tongues or dogs 40 and 41, which tongues are designed to project through cut-out portions 42 and 43 of sleeve 20 into the notches 30 and 31 respectively in the keys 21 and 22. The cut-out portions 42 and 43 in the sleeve 20 are sufficiently wide to permit a substantial angular movement between the sleeve and the ring 35 so that said ring may be turned to interlock with the slotted keys as shown or may be turned to unlock same for sliding movement of the clutch. For the purpose of turning ring 35 relative to the sleeve 20, a plurality of radial tool holes 39 may be formed therein.

Means are provided for constraining the ring 35 to rest in the locked position as shown in Figs. 1 and 3, said means comprising helical springs 50 which are fixed at one of their ends to the sleeve 20 by pins 51 seated therein and at their opposite ends are similarly fixed to the ring 35 by similar pins 52. The ring 35 is cut away at 53 to form, with the cut-out portion 38 of the sleeve 20, an annular groove for receiving said springs 50. The tendency of said springs is to urge the ring 35 to turn relative to sleeve 20 so as to maintain the locking action thereof with respect to the notches 30 and 31 in the keys.

Locking of the clutch sleeve 20 in the upper driving position with respect to gear 12 is accomplished by similar means. That is, the keys 21 and 22 are cut away or notched at 60 and 61 respectively to provide for interlocking with the tongues 40 and 41 of the locking ring 25 when sleeve 20 has been slid to the uppermost position. Similarly the sleeve may be locked in an intermediate or neutral position—that is, the position in which it does not engage either gear 12 or 14—by means of similar notches 70 and 71 in the two keys.

The invention in its broader aspects is not limited to the specific mechanisms shown and described but departures may be made therefrom within the scope of the accompanying claims without departing from the principles of the invention and without sacrificing its chief advantages.

What I claim is:

1. In a clutch construction, in combination, a driving shaft, a driven gear, a coupling member keyed to said shaft to turn therewith and be movable therealong into a driving position and an uncoupled position, and a locking member engageable with said shaft, movable with the coupling member and positionable by relative rotational movement with respect to said coupling member about the axis thereof to hold the coupling member against movement along the shaft in both the driving position and the uncoupled position.

2. In a clutch construction, in combination, a driving shaft, a driven gear, a coupling member comprising a sleeve rotatable with the shaft and axially slidable therealong to engage and be disengaged from the driven gear, and a locking member rotatable with respect to said sleeve about the axis thereof for engagement with said shaft to lock the sleeve against sliding movement when it is in said engaged and disengaged positions.

3. In a clutch construction, in combination, a driving shaft, a driven gear rotatable about said shaft, another driven gear rotatable about said shaft and spaced from said first mentioned gear, a coupling member on the shaft between said gears, said coupling member being rotatable with the shaft and axially slidable therealong so as to engage either one of said spaced gears, and means engageable with said shaft by relative rotary movement with respect to said member about the axis thereof for locking said coupling member in driving position when engaging either one of said gears.

4. In a clutch construction, in combination, a driving shaft, a driven gear rotatable about said shaft, another driven gear rotatable about said shaft and spaced from said first mentioned gear, a coupling member on the shaft between said gears, said coupling member being rotatable with the shaft and axially slidable therealong so as to engage either one of said spaced gears, and means engageable with said shaft and rotatable with respect to said coupling member about the axis thereof for locking said coupling member in driving position when engaging either one of said gears and for locking said coupling member in an intermediate disengaged position.

5. In a clutch construction, in combination, a driving shaft, a driven gear rotatably mounted about the shaft, a coupling sleeve rotatable with said shaft and slidable along a key fixed thereto from an uncoupled position to a driving position engaging said gear, and a locking member turnable with respect to said sleeve to hold same from sliding movement along said key in both the driving position and the uncoupled position, said key being mutilated to permit locking rotation of said locking member with respect thereto.

6. In a clutch construction, in combination, a driving shaft, a driven gear rotatably mounted about the shaft, a coupling sleeve rotatable with said shaft and slidable along a key fixed thereto from an uncoupled position to a driving position engaging said gear, and a locking member turnable with respect to said sleeve to hold same from sliding movement along said key in both the driving position and the uncoupled position, said key being mutilated at a plurality of points in its length to permit locking movement of said locking member at a plurality of points along the shaft.

7. In a clutch construction, in combination, a driving shaft, a pair of spaced, driven gears rotatably mounted about the shaft, a coupling sleeve rotatable with said shaft and slidable along a key fixed thereto from an uncoupled position to spaced driving positions engaging either of said gears, and a locking member coaxial and turnable with respect to said sleeve to hold same from sliding movement along said key in both driving positions and the uncoupled position.

8. In a clutch construction, in combination, a driving shaft, a pair of spaced, driven gears rotatably mounted about the shaft, a coupling sleeve rotatable with said shaft and slidable along a key fixed thereto from an uncoupled position to spaced driving positions engaging either of said gears, and a locking member turnable with respect to said sleeve to hold same from sliding movement along said key in both driving positions and the uncoupled position, said key being mutilated at three spaced-apart points in its length to permit locking rotation of said locking member at each of said driving positions and at said uncoupled position.

9. In a clutch construction, in combination, a driving shaft, a pair of spaced, driven gears rotatably mounted about the shaft, a coupling sleeve rotatable with said shaft and slidable along a key fixed thereto from an uncoupled position to spaced driving positions engaging either of said gears, and a locking member engageable with said key by rotational movement about the axis of said sleeve for locking the sleeve in both driving positions and the uncoupled position.

10. In a clutch construction, in combination, a driving shaft, a driven gear, a coupling member mounted for rotation with said shaft and axially movable therealong from an uncoupled position to driving connection with said gear, a member relatively movable with respect to said coupling member about the axis thereof to engage said shaft for locking the coupling member in either of said positions and means for normally urging said locking member into locking position.

11. In a clutch construction, in combination a driving shaft, a driven gear rotatable about said shaft, another driven gear about said shaft and spaced from said first mentioned gear, a coupling member on the shaft between said gears, said coupling member being rotatable with the shaft and axially slidable therealong so as to engage either one of said spaced gears, and a ring mounted on and coaxial with said coupling member, said ring being relatively angularly movable with respect to the coupling member to engage said shaft for locking said coupling member in either position of gear engagement.

12. In a clutch construction, in combination, a driving shaft, a driven gear, a coupling member mounted for rotation with said shaft and axially movable therealong from an uncoupled position to driving connection with said gear, and means carried by the coupling member engageable with said shaft by relative rotational movement between said member and means about the axis of said member for locking said coupling member in either of said positions.

13. In a clutch construction, in combination, a driving shaft, a driven gear rotatably mounted about the shaft, a coupling sleeve rotatable with said shaft and slideable along a key fixed thereto from an uncoupled position to a driving position engaging said gear, and a locking member relatively rotatable with respect to said sleeve about the axis of said sleeve for engagement with said key and slidable with said sleeve along said shaft to hold said sleeve from sliding movement along said key in both driving position and uncoupled position.

14. In a clutch construction, in combination, a driving member, a pair of driven members, a coupling member movable from an uncoupled position to driving connection with either of said driven members, and means carried by the coupling member engageable with said driving member by relative rotational movement with respect to said coupling member about the axis thereof for locking said coupling member in any one of said three positions.

CURTIS S. CRAFTS.

REFERENCES CITED

The following references are of record in the file of this patent:

UNITED STATES PATENTS

| Number | Name | Date |
| --- | --- | --- |
| 400,293 | Brooks | Mar. 26, 1889 |
| 1,199,452 | Coffey | Sept. 26, 1916 |
| 1,623,236 | De Roo | Apr. 5, 1927 |
| 2,070,140 | Peterson et al. | Feb. 9, 1937 |
| 2,248,134 | Snow | July 8, 1941 |